United States Patent [19]
Takada et al.

[11] Patent Number: 5,949,072
[45] Date of Patent: Sep. 7, 1999

[54] PYROELECTRIC INFRARED RAY SENSOR

[75] Inventors: Yuji Takada; Teruki Hatatani; Toshio Fujimura; Shinji Sakamoto, all of Kadoma, Japan

[73] Assignee: Matsushita Electric Works, Ltd., Osaka, Japan

[21] Appl. No.: 08/972,867

[22] Filed: Nov. 18, 1997

[30] Foreign Application Priority Data

| Mar. 26, 1997 | [JP] | Japan | 9-073852 |
| Apr. 9, 1997 | [JP] | Japan | 9-091047 |
| Apr. 9, 1997 | [JP] | Japan | 9-091048 |
| Apr. 9, 1997 | [JP] | Japan | 9-091049 |

[51] Int. Cl.$^6$ .................................................. G01J 5/00
[52] U.S. Cl. ............................................................ 250/338.3
[58] Field of Search .......................... 250/338.3, 338.1, 250/338.2, 338.4

[56] References Cited

U.S. PATENT DOCUMENTS

| 4,803,363 | 2/1989 | Gaalema et al. | 250/338.4 |
| 4,849,737 | 7/1989 | Kirihata et al. | 340/567 |
| 4,851,681 | 7/1989 | DePaili | 250/338.1 |
| 4,973,843 | 11/1990 | Murata et al. | 250/338.3 |
| 5,684,303 | 11/1997 | Kim et al. | 250/338.3 |

*Primary Examiner*—Constantine Hannaher
*Assistant Examiner*—Albert Gagliardi
*Attorney, Agent, or Firm*—Lynn & Lynn

[57] ABSTRACT

A pyroelectric infrared ray sensor is constituted with a current-voltage converting circuit utilizing an impedance of feedback capacity, obtained by adding the feedback capacity to an operational amplifier receiving as an input an element current from a pyroelectric element, whereby the current-voltage converting circuit can be improved in S/N ratio without altering characteristics of the pyroelectric element.

13 Claims, 13 Drawing Sheets

$$* \tau dc = \sqrt{R1 \times C1 \times R1 \times Cf}$$

PYROELECTRIC INFRARED RAY SENSOR

BACKGROUND OF THE INVENTION

This invention relates to pyroelectric infrared ray sensors employable as radiant heat meter and the like which detect radiant infrared ray energy radiated from human body to determine the presence or movement of the human body or detecting radiant energy and room temperatures.

DESCRIPTION OF RELATED ART

The pyroelectric infrared ray sensors of the kind referred to has been comprised of a current-voltage converting circuit employing FET. This current-voltage converting circuit is so constituted that an infrared ray receiving section is provided to connect a single type pyroelectric element and a high resistor in parallel to the gate of FET and to get a voltage signal from an output resistor connected to the source and ground of FET, a signal current output from the pyroelectric element which has detected any radiant heat is converted at the high resistor to a voltage, the converted voltage is received at the gate of FET to cause a source voltage of FET varied by a current made to flow to FET and the resistor, and the voltage applied to the resistor at this time is provided as an output to a signal amplifying circuit.

There has been also suggested a current-voltage converting circuit in which two dual type pyroelectric elements constitute two infrared ray receiving sections, which sections are connected in series.

In the foregoing current-voltage converting circuit employing FET, the output voltage V denoting the sensibility to the infrared ray is obtained by a following formula.

FORMULA 1:

$$V = P\frac{\eta A \omega Rg}{G}\lambda \frac{1}{\sqrt{1+\left(\frac{\omega}{\omega e}\right)^2}\sqrt{1+\left(\frac{\omega}{\omega t}\right)^2}}$$

wherein the emissivity: $\eta$; effective ray receiving area: $A$; input resistance: $R$; pyroelectricity coefficient: $\lambda$; thermal diffusion coefficient: $G$; thermal time constant: $\tau t$; and electric time constant: $\tau e$.

In such current-voltage converting circuit employing FET, further, generated noise can be obtained with such formulae as follows.

FORMULAE 2:

Noise output voltage: $VN = \sqrt{Vr^2 + V\delta^2 + Vi^2 + Vn^2 + Vt^2}$

Input resistance noise: $Vr = \dfrac{\sqrt{4kTR}}{\sqrt{1+\left(\frac{\omega}{\omega e}\right)^2}}$ tan $\delta$ noise: $V\delta = \dfrac{R\sqrt{4kT\omega Ci\tan\delta}}{\sqrt{1+\left(\frac{\omega}{\omega e}\right)^2}}$ FET current noise: $Vi = \dfrac{In R}{\sqrt{1+\left(\frac{\omega}{\omega e}\right)^2}}$ FET voltage noise: $Vn = En$ Thermal noise: $Vt = \dfrac{R\sqrt{4kT^2G}}{\eta}$ wherein Boltzman's constant: $k$; absolute zero: $T$; element capacity: $Ci$; element's dielectric loss: tan $\delta$ current noise of FET: $In$; and voltage noise of FET: $En$.

However, what is important for the infrared ray sensor is not merely the largeness of the output signal S at the pyroelectric element, but rather its ratio with respect to the generated noise N, that is, to attain the optimum S/N ratio. Even when the output signal with respect to the same incident infrared ray power is made twice as large as conventionally obtained signal by improving the pyroelectric element, for example, a steady-state output noise happened to be increased four times as large eventually renders the output resolving or detecting precision decreased to ½, so that the infrared ray sensing ability may happen to be decreased adversely.

In order to improve the sensing ability of the infrared ray sensor, therefore, it is decisive of the conformity and non-conformity of the infrared ray sensor, that is, the product value of the sensor, how the output noise N can be restricted to be small or how the larger S/N ratio can be obtained, in addition to how the output signal S can be enlarged, with respect to the same infrared ray input.

When the conventional pyroelectric element employing FET is analyzed here, the basic sensibility is determined by the emissivity $\eta$, effective ray receiving area A, input resistance R, pyroelectricity coefficient $\lambda$ and thermal diffusion coefficient G, while the frequency characteristics are determined by the thermal time constant $\tau t$ and electric time constant $\tau e$, as will be clear from Formula 1 of the output voltage V.

Thus the sensor has been arranged for obtaining the largest possible signal output by optimumly setting these parameters respectively, but in practice it has been mainly important to develop the pyroelectric element of any new material to improve the pyroelectricity coefficient, or to develop mounting process of the element to improve the thermal diffusion coefficient.

Further, the noise in the pyroelectric element consists of 1) the input resistance noise Vr, 2) tan $\delta$ noise $V\delta$, 3) FET current noise Vi, 4) FET voltage noise Vn and 5) thermal noise Vt, and can be obtained by the foregoing Formulae 2, and ultimately the noise output voltage VN is determined by a square average of the respective noises.

When typical one of the parameters is analyzed, taking notice the frequency around 1 Hz which is important as a sensing frequency for sensing the human body as the most remarkable application of the pyroelectric element, a ruling one will be the thermal noise due to the input resistance. It should be clear that this input resistance thermal noise can be reduced when the resistance value is further increased.

When the high resistance is of a value exceeding 100 G$\Omega$, however, the resistance is almost of the limit value, taking into account the operational stability of the pyroelectric element, that is, any external noise, fluctuation in biasing current of FET, variation in the resistance value of the high resistance itself, and any further noise reduction is almost impossible. Accordingly, the conventional pyroelectric infrared ray sensors almost have reached the limit in respect of the noise characteristics.

According to a result of investigation made by the present inventors as to the possibility of improvement in the S/N ratio of the case employing the conventional current-voltage converting circuit with FET employed, the reduction of noise almost cannot be expected, and the only measures left remained will be to increase the output signal with improvements in, for example, the pyroelectricity coefficient, thermal diffusion coefficient and the like. In practice, however, various improvements in the output characteristics are approaching the limit so that, in the status quo, the improvement of S/N ratio to an extent of twice or tripple as much will be extremely difficult to be expected only by changing the element or mounting conditions.

SUMMARY OF THE INVENTION

The present inventors have experimentally tried to use the frequency characteristics of the impedance of the element capacity which the pyroelectric element has, and, as a result of repeated investigation, have reached the present invention, recognizing that the use is advantageous and realizable in improving the S/N ratio of the pyroelectric infrared ray sensor.

That is, instead of relying on any measures for modifying the material of the pyroelectric element, the present inventors have realized the present invention by constituting a current-voltage converting circuit with a connection to a pyroelectric element of an operational amplifier to which another pyroelectric element is added as a feedback capacity, and carrying out various simulations and empirical designs for reducing the input conversion noise of this current-voltage converting circuit.

In the present invention, the infrared ray sensor comprises the current-voltage converting circuit formed by connecting a first pyroelectric element to an operational amplifier to which an AC feedback circuit and a DC feedback circuit are additionally connected, and the AC feedback circuit is constituted by a second pyroelectric element, so that the foregoing problem in the conventional examples can be overcome. In the above arrangement, the pyroelectric element can be used as it is in the AC feedback circuit, without employing any capacitor manufactured as an electronic part.

Other objects and advantages of the present invention shall become clear as the description of the invention advances as detailed with reference to embodiments shown in accompanying drawings.

Figure 1A:
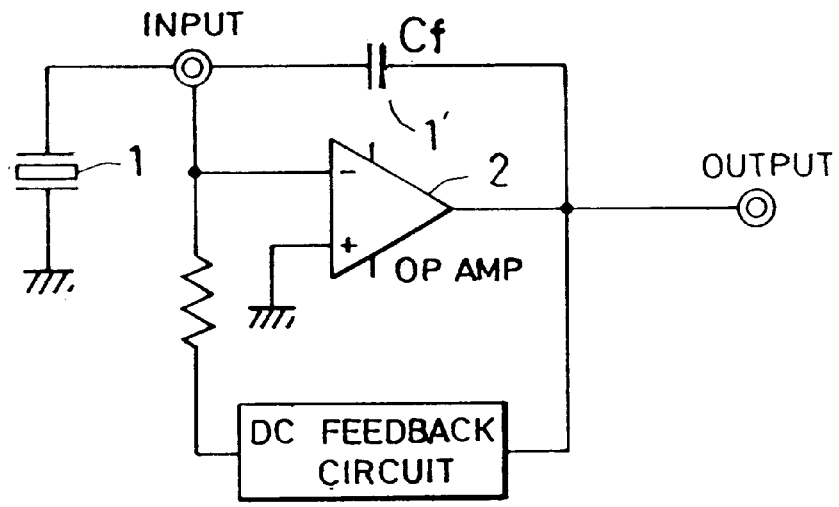
FIGS. 1A to 1C show respectively a schematic circuit diagram showing a basic arrangement of the pyroelectric infrared ray sensor according to the present invention.

While the present invention shall now be described with reference to the respective embodiments shown in the drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1B:
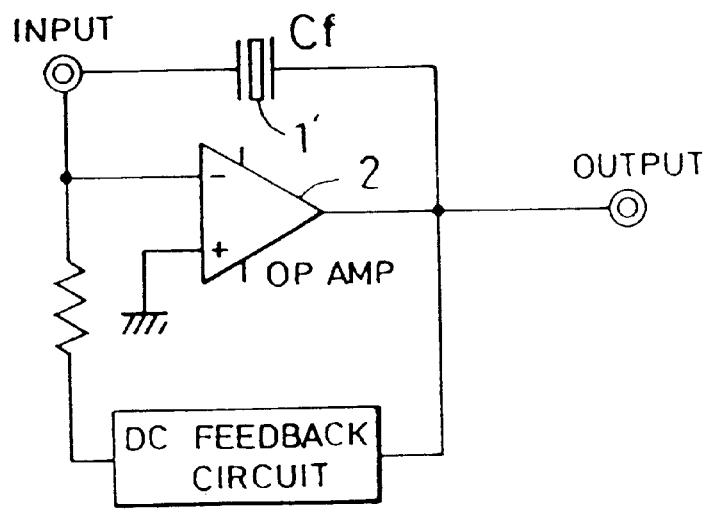
Figure 1C:
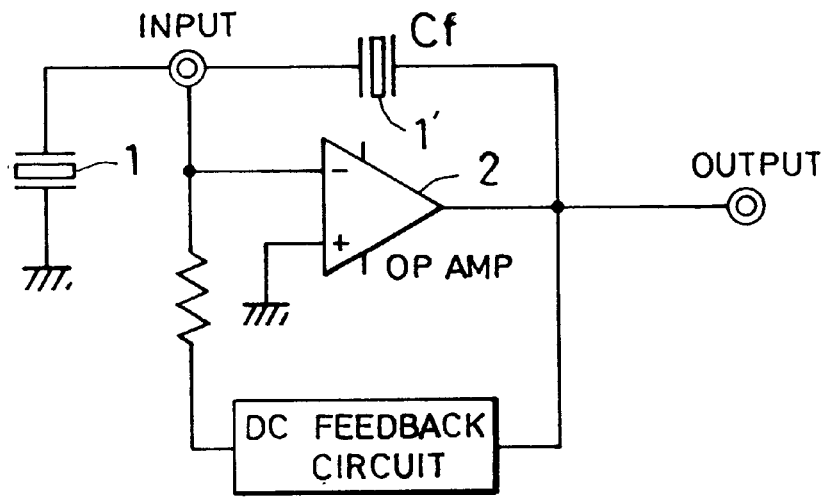

Referring to FIGS. 1A to 1C, there are shown basic arrangements respectively of a current-voltage converting circuit forming an essential part of each of different working aspects of the infrared ray sensor according to the present invention, in the arrangement of FIG. 1A of which a pyroelectric element is connected at an end to the ground and at the other end to an input terminal (inverted input terminal in the drawing) of an operational amplifier 2, and a capacitor 1' is connected as a feedback capacity Cf across the input and output terminals of the operational amplifier 2. Here, the feedback capacity Cf is forming an AC feedback circuit. Across the input and output terminals of the operational amplifier 2, further, a DC feedback circuit 3 is provided for stabilizing the circuit operation in low input range, so that an output of the operational amplifier 2 will be fed back through an input resistor Ri.

Figure 2:
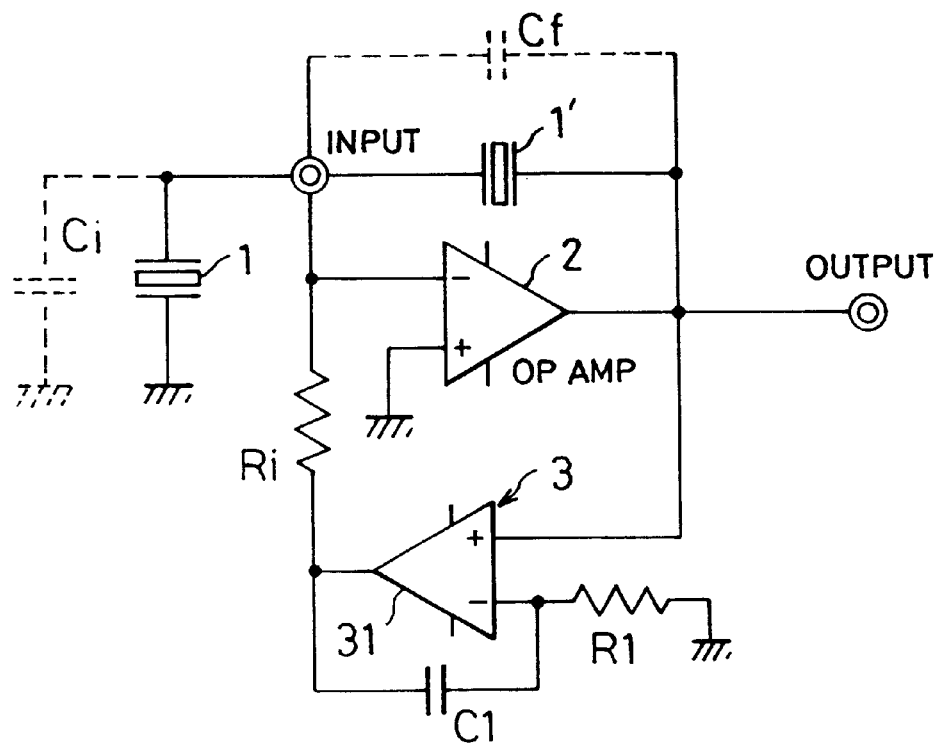
FIG. 2 is a schematic circuit diagram showing a concrete aspect of the sensor of FIG. 1.

Such DC feedback circuit 3 can be constituted by an integration circuit comprising another operational amplifier 31 than the operational amplifier 2 for the impedance conversion and provided with a capacitor C1 and a resistor R1, as shown in FIG. 2.

According to the current-voltage converting circuit of this arrangement, a current output from the pyroelectric element 1 is converted into a voltage with an impedance of the feedback capacity Cf utilized.

In another aspect of FIG. 1B, only a pyroelectric element 1' is connected across the input and output terminals of the operational amplifier 2, and the feedback capacity Cf is obtained by this pyroelectric element 1' in this arrangement.

In another aspect of FIG. 1C, further, the arrangement is so made that the capacitor 1' in FIG. 1A is replaced by the pyroelectric element, and the feedback capacity Cf is obtained by this pyroelectric element 1'. In these aspects of FIGS. 1B and 1C, other respects than those have been described are substantially the same as in the arrangement of FIG. 1A.

Figure 3:
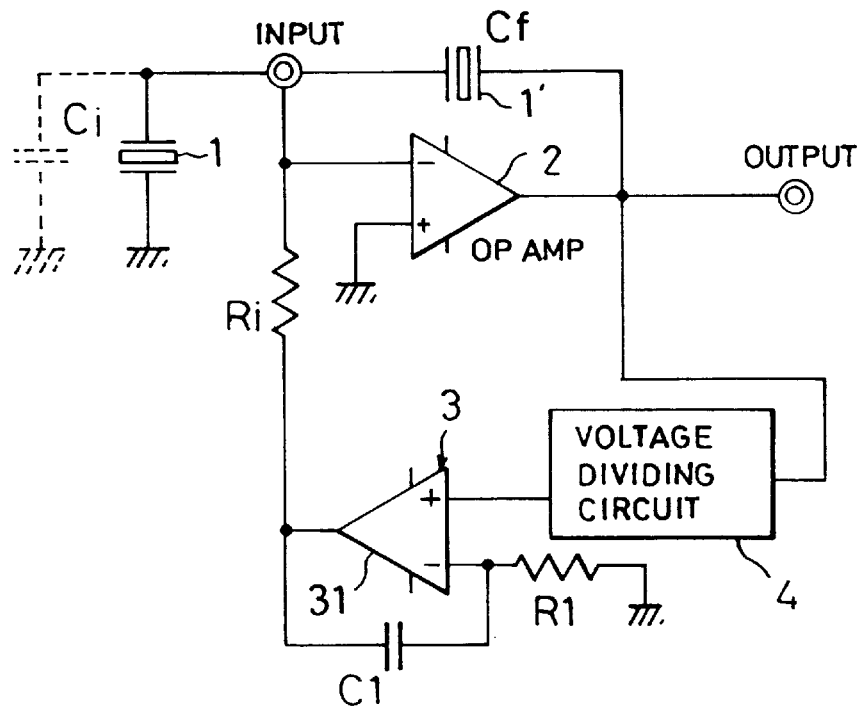
FIGS. 3 and 4 are schematic circuit diagrams showing further concrete aspects of the sensor of FIG. 1.
Figure 4:
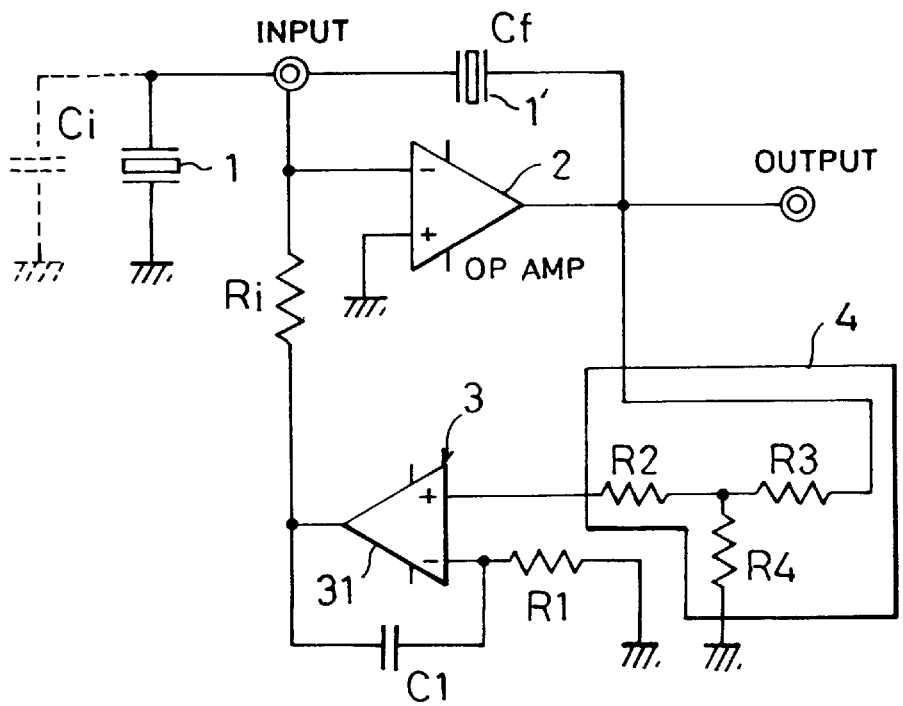

FIGS. 3 and 4 show an arrangement in which a voltage dividing circuit 4 is further connected to the DC feedback circuit 3, in which constituent elements corresponding to the elements shown in FIG. 1 are denoted by the same reference symbols and their description shall be omitted. In this working aspect shown in FIG. 3, the DC feedback circuit 3 comprising the integration circuit receives as an input the output voltage from the operational amplifier 2 as divided by the voltage dividing circuit 4.

In a working aspect of FIG. 4, three input resistors R2–R4 are connected mutually at their one end into T-shape and at their other ends respectively to the input terminal of the operational amplifier 2, output terminal of another operational amplifier 31 and the ground, so that a nominal feedback gain of the feedback circuit will be reduced by the T-shape connection of the resistors R2–R4, and the feedback time constant of the integration circuit will be caused to shift to the lower zone to render the time constant substantially enlarged and respective parts of the DC feedback circuit minimized.

The voltage dividing circuit 4 is not required to be always of the three resistors in the T-shape as shown in FIG. 4, but may be of an aspect of ordinary connection of two resistors, while the T-shaped resistors will be more advantageous when properties in respect of the off-set and the like of the DC feedback circuit are taken into account.

Since in the above arrangement an element current from the first pyroelectric element 1 is converted into the voltage by the utilization of the impedance of the feedback capacity Cf, in contrast to the conventional circuit employing the FET buffer, the thermal noise of the resistor which has been ruling the output noise voltage is removed as will be clear from a later described analysis, whereby a fundamental elimination of noise source can be realized, and a reduction of total noise can be established.

Since the second pyroelectric element 1' also operates as the infrered ray sensing element, further, it is possible to obtain a larger sensibility by setting the polarity of this second element 1' to be the same as that of the first pyroelectric element 1 so as to add their outputs to each other. When at this time the first and second pyroelectric elements 1 and 1' are made mutually inverse polarity, any simultaneously sensed infrared rays at both pyroelectric elements 1 and 1' due to sunbeams or fluctuation in the temperature can be cancelled as a noise, so that any malfunction is made less to improve the reliability.

In FIGS. 5 to 8, there are shown concrete examples in which a dual type pyroelectric element is used. When such dual type pyroelectric elements are used as the first and second pyroelectric elements, it is made possible to employ two infrared ray receiving sections formed on a pyroelectric element substrate and connected in series respectively as the first and second pyroelectric elements or to employ each of these two infrared ray receiving sections as the first and second pyroelectric elements.

Figure 5A:
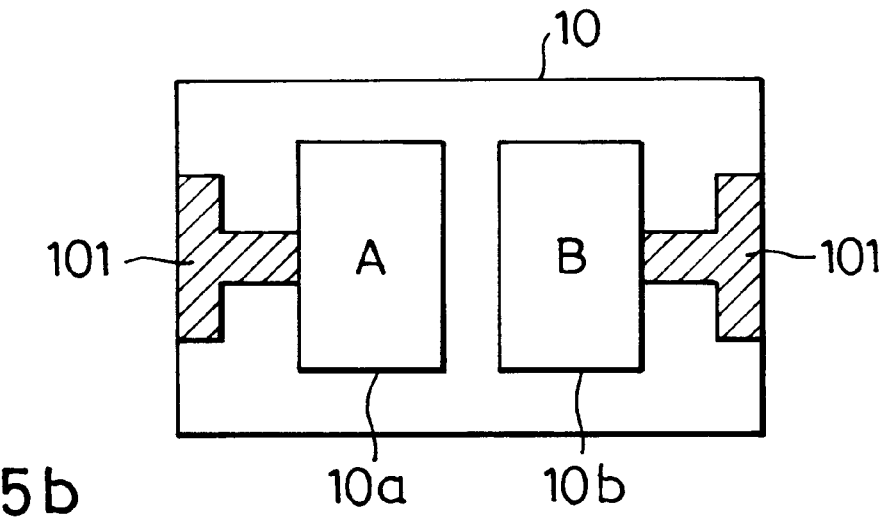
FIGS. 5a and 5b are explanatory views for a concrete example of the pyroelectric element employed in FIG. 1.
Figure 5B:
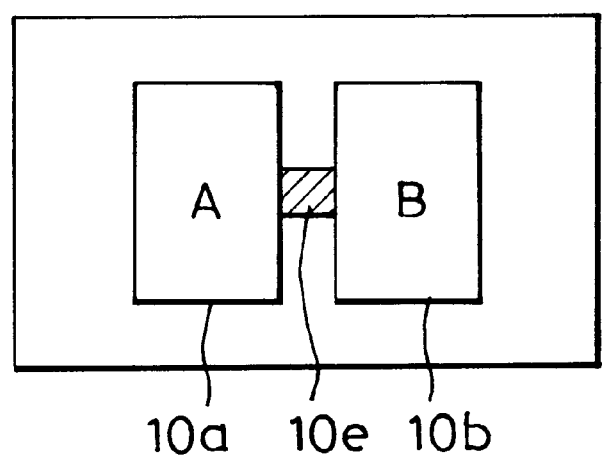
Figure 6:
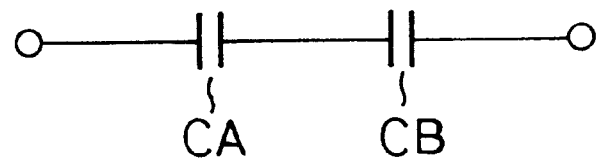
FIG. 6 is an equivalent circuit diagram of the pyroelectric element shown in FIGS. 5a and 5b.
Figure 7A:
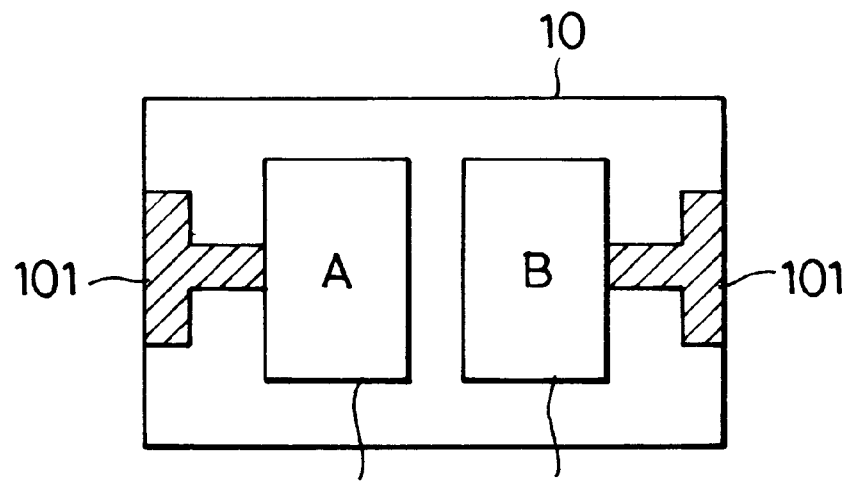
FIGS. 7a and 7b explanatory views for another concrete example of the pyroelectric element employed in the sensor of FIG. 1.
Figure 7B:
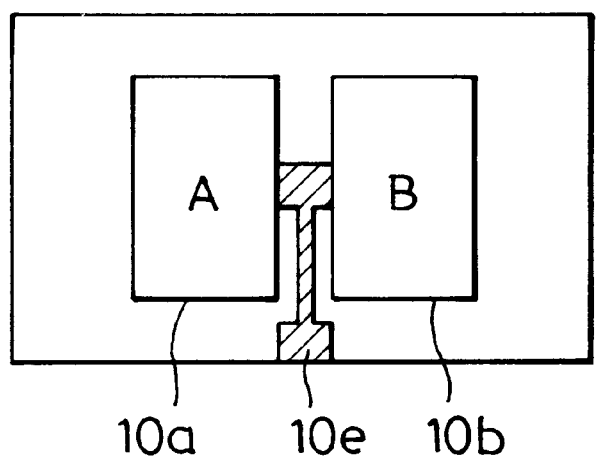
Figure 8:
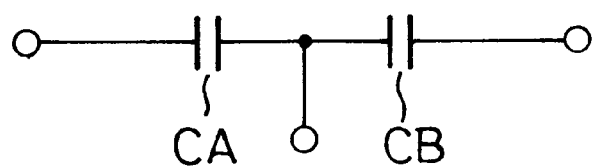
FIG. 8 is an equivalent circuit diagram of the pyroelectric element showing in FIGS. 7a and 7b.

More specifically, FIGS. 5a and 5b show conductor patterns on both surfaces of the pyroelectric element substrate 10 in which the two infrared ray receiving sections 10a (A) and 10b (B) are connected in series and employed as the first and second pyroelectric elements. The conductor pattern on the reverse side surface of FIG. 5b is shown as seen through from the front side surface. A further conductor pattern 10e forming a conducting path connecting between respective connecting terminals or the receiving sections may be provided. As shown in an equivalent circuit of FIG. 6, a pair of capacity elements CA and CB are formed by the two infrared ray receiving sections 10a and 10b on the front and rear surfaces of the pyroelectric element substrate, and the first and second pyroelectric elements are constituted respectively by connecting in series the two capacity elements CA and CB. FIGS. 7a and 7b show also a conductor pattern in another aspect on the front and rear surfaces of the pyroelectric element substrate 10 (FIG. 7b showing the rear side pattern as seen through the front side) and FIG. 8 shows an equivalent circuit of the pattern. In this equivalent circuit, the capacity elements CA and CB are formed by the two infrared ray receiving sections 10a and 10b formed on the front and rear surfaces of the substrate 10, and the capacity element CB is arranged to form the second pyroelectric element which functions as the feedback capacity.

Figure 9A:
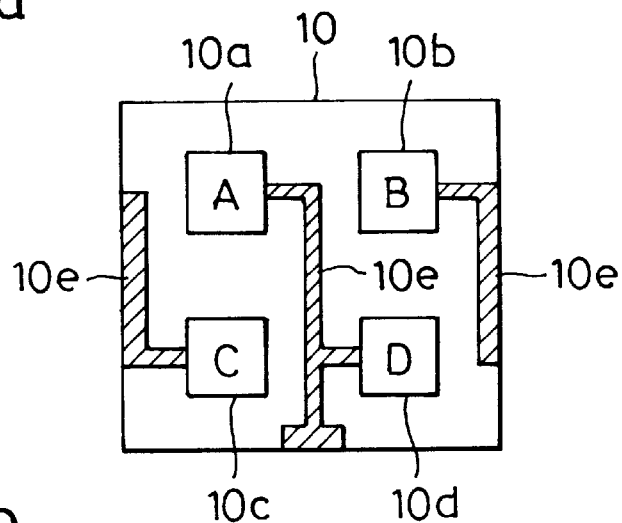
FIGS. 9a and 9b are explanatory views for another concrete example of the pyroelectric element employed in the sensor of FIG. 1.
Figure 9B:
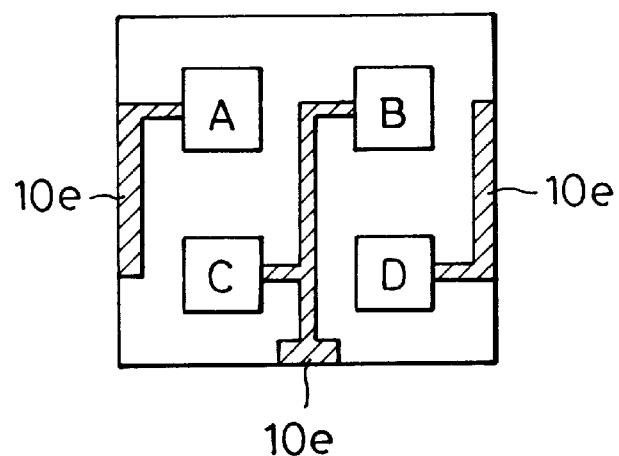
Figure 10:
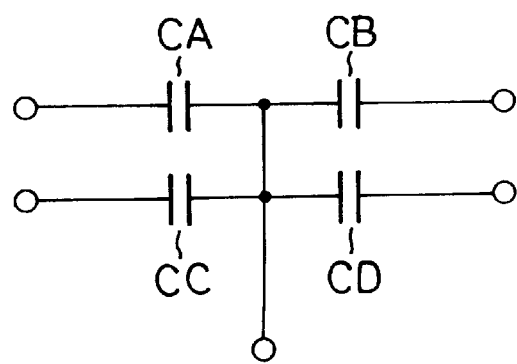
FIG. 10 an equivalent circuit diagram of the pyroelectric element shown in FIGS. 9a and 9b.
Figure 11:
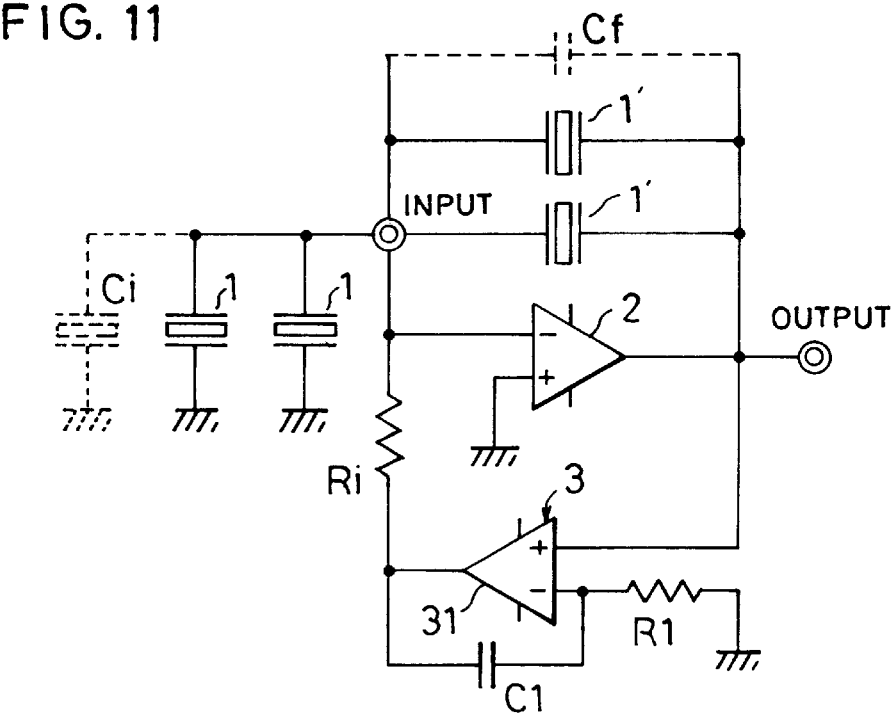
FIG. 11 is a schematic circuit diagram of another concrete aspect of the sensor of FIG. 2.

FIGS. 9 and 10 show an example of an aspect in which multielement type pyroelectric elements are employed. Thus, in FIGS. 9a and 9b, conductor patterns on the front and rear side surfaces of the pyroelectric element substrate in which four infrared ray receiving sections are used as connected in series and parallel are shown, and FIG. 10 shows an equivalent circuit of the patterns. In this aspect, among four infrared ray receiving sections 10a (A) to 10d (D), a pair of the sections 10a (A) and 10c (C) as well as another pair of the sections 10b (B) and 10d (D) are respectively connected in parallel and used as the first and second pyroelectric elements 1 and 1', the sections in the parallel connection of the capacity elements CA and CC constitute the first pyroelectric element 1, and others in the parallel connection of the capacity elements CB and CD constitute the second pyroelectric element 1'. FIG. 11 shows a current-voltage converting circuit constituted by the multielement type pyroelectric elements, as arranged in correspondence with FIG. 2. In FIGS. 9a and 9b, further, the respective sections on left and right sides are short-circuited through the conductor parts 10e on the front and rear side surfaces.

Next, the frequency characteristics of the current-voltage converting circuit shall be described. A result of simulation in respect of the circuit shown in FIG. 2 in which the DC feedback circuit is formed by the integration circuit is referred to first. The aspect employing the dual type or multielement type pyroelectric elements will become the same when the values of resultant capacity and resultant feedback capacity are replaced.

Figure 12:
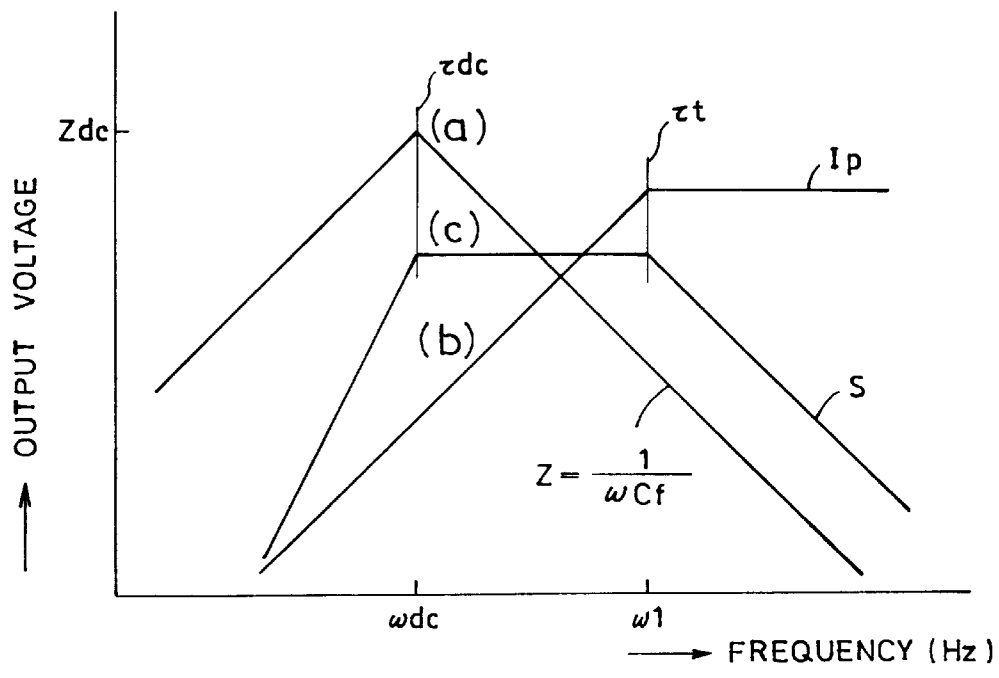
FIG. 12 is a diagram showing convertion impedance characteristics in the sensor of FIG. 2.

Analyzing initially the output voltage V which will be the signal output, a conversion impedance Z and element current Ip can be obtained through the following Formulae 3, and its conversion impedance characteristics are shown in FIG. 12.

FORMULAE 3:

Conversion impedance:

$$Z = \frac{1}{\omega \text{dc} \times Cf \sqrt{1 + \left(\frac{\omega \text{dc}}{\omega}\right)^2} \sqrt{1 + \left(\frac{\omega}{\omega \text{dc}}\right)^2}}$$

-continued

Element current: $Ip = \dfrac{\omega Ipo}{\sqrt{1+\left(\dfrac{\omega}{\omega t}\right)^2}}$ As seen in FIG. 12, the impedance characteristics of a sloped portion with respect to the frequency are given by $Z=1/(\omega \cdot Cf)$, so that the impedance value is to rise as the frequency decreases but, since the DC feedback circuit is being operated, the impedance is caused to fall inversely after a frequency determined by the time constant $\tau dc$ of the feedback circuit.

That is, the impedance Z draws a curve having a peak at an angular velocity $\omega dc$ determined by the time constant $\tau dc$ of the feedback circuit.

Here, the time constant of the feedback circuit is:

$\tau dc = \sqrt{(R1 \cdot C1 \cdot Ri \cdot Cf)}$ $= 1/\omega dc$

Further, the element current Ip output from the pyroelectric element shows such characteristics as HPF having a pole at a thermal time constant $\tau t$.

Now, the output voltage V is a product of the conversion impedance Z and the element current Ip, and is obtained as $V=Z \times IP$.

As a result, the impedance eventually shows such characteristics as BPF of which a low range cut-off frequency is determined by the time constant $\tau dc$ and a high range cut-off frequency is determined by the thermal time constant $\tau t$.

Figure 13:
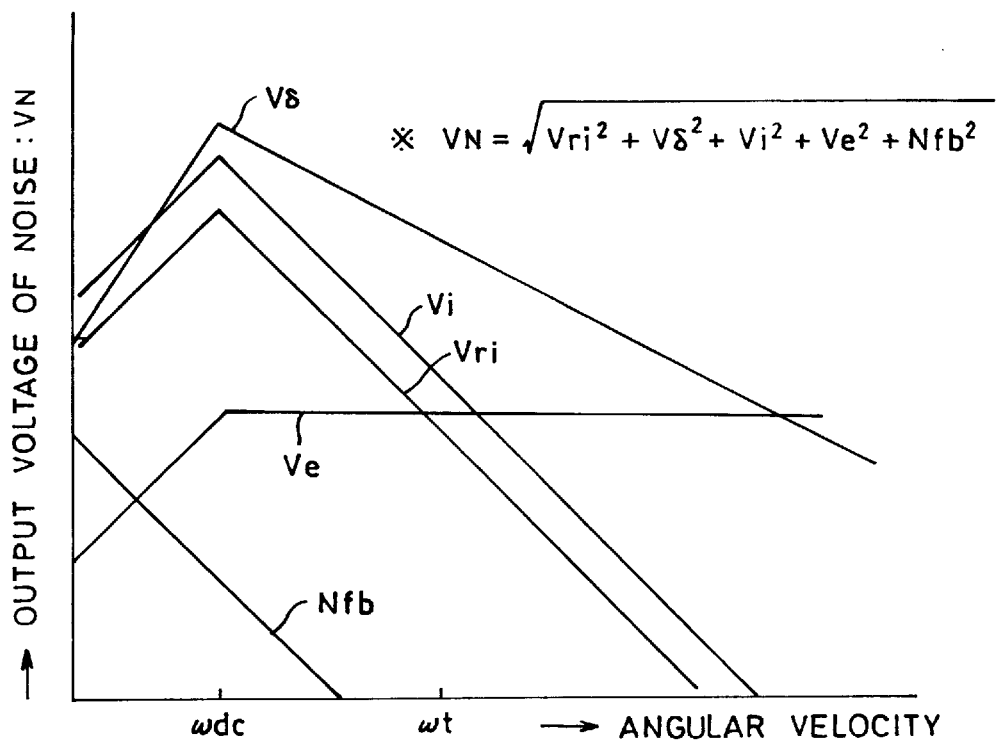
FIG. 13 is a diagram showing noise characteristics in sensor of FIG. 2.

Analyzing next the noise characteristics, FIG. 13 shows a result of analysis of the respective noise voltages, in which the thermal noise and 1/f noise of the operational amplifier are not much influenced, and represent their ruling parameter.

The noise output voltage comprises: 1) tan $\delta$ noise $V\delta$, 2) OP Amp. current noise Zi, 3) OP Amp. voltage noise Ve, and 4) FB system noise Nfb, which are obtained through such Formulae 4 as in the followings.

Figure 14:
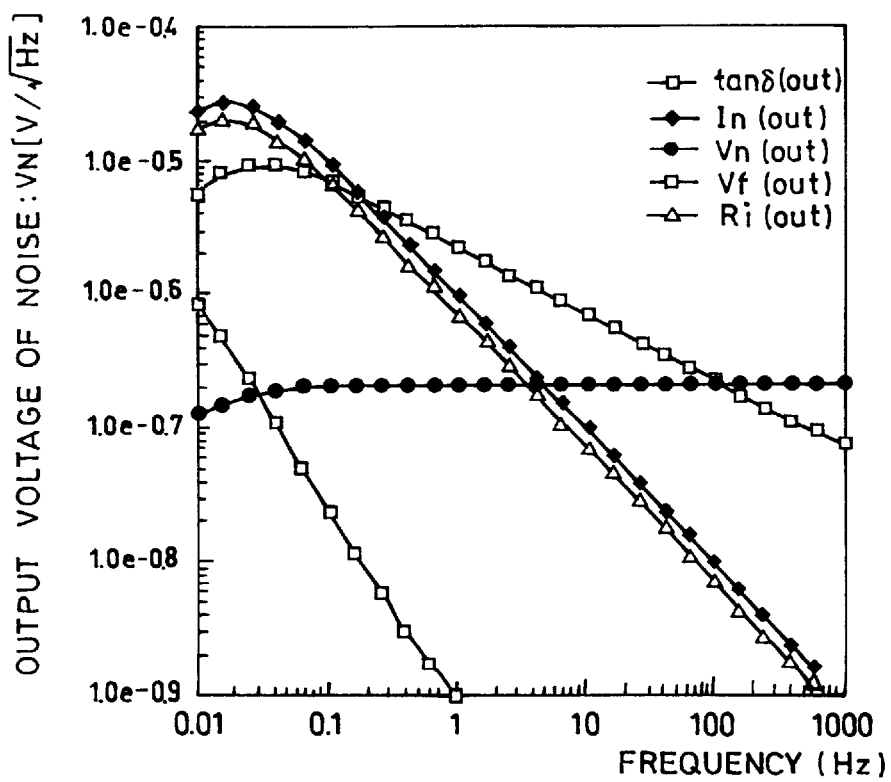
FIG. 14 a diagram showing output voltage characteristics of noise in the sensor of FIG. 2.
Figure 15:
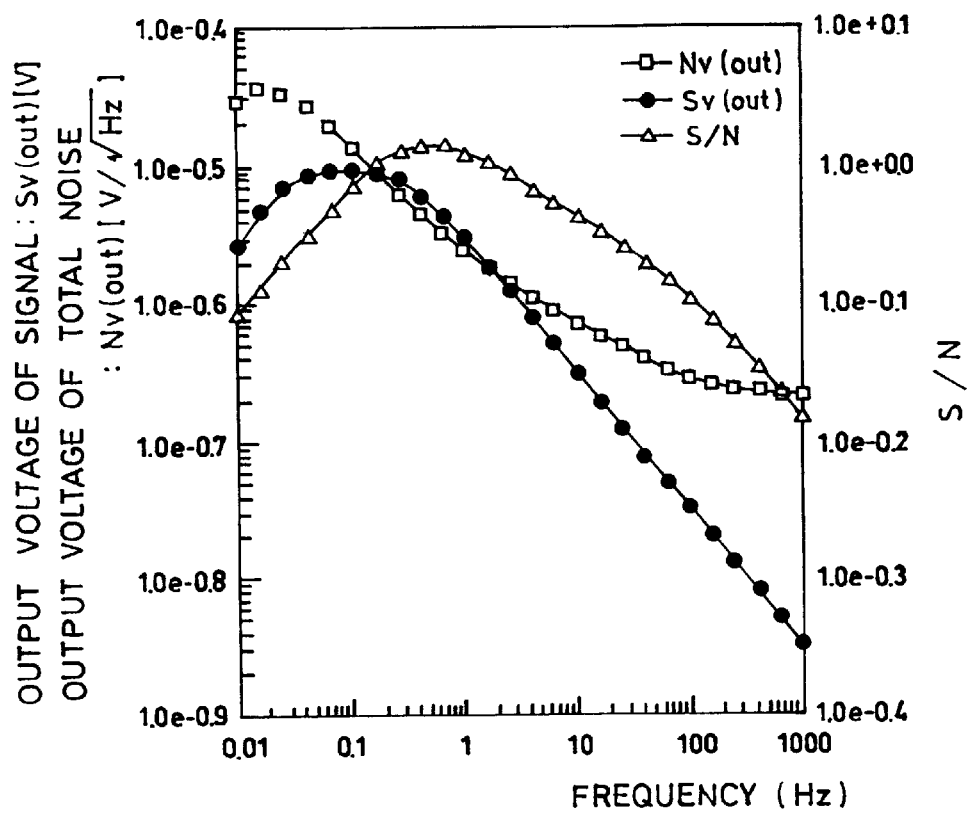
FIG. 15 is a diagram showing S/N characteristics in the sensor of FIG. 2.

FORMULAE 4:

tan $\delta$ noise: $V\delta = Z\sqrt{4kT\omega(Cf \tan\delta f + Ci \tan\delta i)}$ OP Amp. Current Noise: $Vi = Z\sqrt{2qIb}$ OP Amp. Voltage Noise: $Ve = vnGv$ FB System Noise:

$Nfb = \dfrac{Z}{Ri}\sqrt{\dfrac{4kT}{Ri}\left(\dfrac{1}{\omega C1}\right)^2 + vnf^2\left(1+\dfrac{1}{\omega C1 R1}\right)^2 + inf^2\left(\dfrac{1}{\omega C1}\right)^2}$ Ri Thermal Noise: $Vnf = Z\sqrt{4kT/Ri}$ wherein $Z = \dfrac{1}{\omega dc \times Cf \sqrt{1+\left(\dfrac{\omega dc}{\omega}\right)^2}\sqrt{1+\left(\dfrac{\omega}{\omega dc}\right)^2}}$ $GV = \dfrac{Z\sqrt{1+\left(\dfrac{\omega}{\omega i}\right)^2}}{Ri} + 1$ FIG. 14 shows a result of the simulation carried out by calculating in fact the respective noises with the typical parameters, while FIG. 15 shows results of the simulation of S/N ratio. As will be clear from the respective noise characteristics, the noise $V\delta$ due to the dielectric loss tan $\delta$ of capacitor is overwhelming (around 1 Hz), and FIG. 15 shows its total noise as Nv and the signal output as Sv. S/N ratio can be obtained by Sv/Nv.

For the purpose of comparison with conventional one employing the FET buffer, the simulation was carried out with respect to the current-voltage converting circuit, under the same conditions as in the present invention.

As a result of both analysis, the S/N ratio according to the present invention is:

$Nv(\text{out}) = 2.4[\mu v / \sqrt{Hz}]$ $Sv(\text{out}) = 3.0[\mu v]$ therefore, S/N=1.3 (but 1 Hz).

On the other hand, S/N ratio according to a conventional system employing FET buffer was:

$Nv(\text{out}) = 2.4[\mu v / \sqrt{Hz}]$ $Sv(\text{out}) = 1.4[\mu v]$ therefore, S/N=0.58 (but 1 Hz)

as a result of calculation.

From the foregoing results of the simulation, it has been found that, according to the present invention, an improvement in S/N ratio is attained to an extent of about twice as much as that in the case where the FET buffer has been used, around 1 Hz important as the frequency for detecting the human body.

It has been also found that, since the element capacity Ci has changed from 20pF to 10pF, the noise reduction has been realized with the same element sensibility.

Qualitatively analyzing the above, it appears that the noise reduction as a whole has been realized by the removal of the thermal noise due to the resistance Rg which has been overwhelming as the conventional noise component. While in the results of simulations of FIGS. 14 and 15 the noise has not been reduced in the absolute value since the conversion impedance has risen than in the case of using the FET buffer, the signal output voltage Sv is also raised by that extent and, consequently, the S/N ratio has been improved.

According to a noise analysis performed by the present inventors, further, it has been found that the smaller the feedback capacity of the operational amplifier, the higher the S/N ratio made obtainable. In the example of the simulation, it has been also possible to attain a further twice as high improvement as that in the conventional system, by rendering the element capacity of the pyroelectric element constituting the feedback capacity to be a smaller value than 10pF.

In view of the results of the noise analysis confirmed by the present inventors, further, the current noise of the operational amplifier used for the I/V conversion should preferably be smaller for obtaining the higher S/N ratio, and the operational amplifier of a type small in the input bias current, that is, of a type high in the input impedance is desirable. As the operational amplifier satisfying such conditions, in general, the one of a type using FET at input stage may properly be used.

Figure 16:
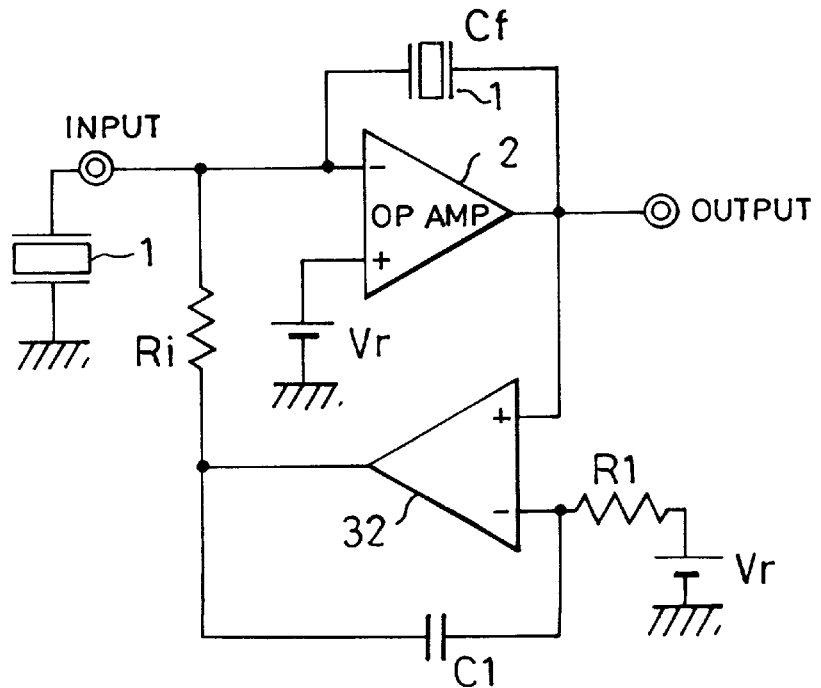
FIG. 16 is a schematic circuit diagram showing the sensor including a DC feedback circuit employed according to the present invention.

Referring next to the pyroelectric infrared ray sensor as shown in FIG. 16 of the present invention, the resistor Ri is connected between the output terminal of the operational amplifier 32 to which a feedback capacitor C1 is connected and the inverted input terminal of the operational amplifier 2 to which a certain feedback capacity Cf of the second pyroelectric element 1' is added, the further resistor R1 is connected to a source of reference voltage Vr, and the DC feedback circuit is thereby constituted. The first pyroelectric element 1 is connected to the inverted input terminal, and in this respect the circuit arrangement is the same as the foregoing circuits. Further, the output terminal of the operational amplifier 2 is directly connected to a non-inverted input terminal of the operational amplifier 32, and the reference voltage Vr is provided to a non-inverted input terminal of the operational amplifier 2.

Further, in this circuit, the arrangement is so made that, with the reference voltage Vr provided to both operational amplifiers 2 and 32, the output signal can be obtained with respect to the input signal of either the positive or negative polarity, by raising the operative point to the level of Vr, even when the operational amplifiers are of unilateral source driving system. In this case, the reference voltage Vr is set to be within a range of 0<Vr<VDD (wherein VDD is a driving source voltage of the operational amplifier), and it is made possible to obtain the largest operational range with respect to the input signal either of the positive and negative input signals by setting the reference voltage Vr=VDD/2. Such DC feedback circuit functions as a band pass filter, and an impedance Z(S) at this time is represented by a following Formula 5:

FORMULA 5:

$$Z(S) = -Rds \cdot \frac{\frac{1}{CfRi}S}{S^2 + \frac{1}{CfRi}S + \frac{1}{C1R1CfRi}}$$

Here, as the standard type of secondary band-pass filter is represented by a following Formula 6, a further Formula 7 is obtained from both Formulae 5 and 6 as in the following:

FORMULA 6:

$$T(S) = \frac{\left(\frac{\omega 0}{Q}\right)S}{S^2 + \left(\frac{\omega 0}{Q}\right)S + \omega 0^2}$$

FORMULA 7:

$$\omega 0 = \frac{1}{\sqrt{C1R1CfRi}} \quad Q = \sqrt{\frac{CfRi}{C1R1}\left(=\frac{f0}{B}\right)}$$

That is, it is seen that the frequency characteristics of the conversion impedance in this circuit perform the function of band-pass filter. Here, ω10 is the center frequency, and Q is generally regarded as the selectivity.

In the current-voltage converting circuit in the pyroelectric infrared ray sensor at this time, the thermal noise due to the resistor Ri comes into question as one of the noise components. In order to restrain this, the value of Ri must be set to be of such high resistance as to be more than about 1T(tera)Ω, but this high resistance is large in the temperature characteristics, so that the value of Ri will be caused to be remarkably fluctuate due to temperature variation. As the resistance value becomes large, a peak is caused to appear in the frequency characteristics of the conversion impedance, and the circuit falls in an unstable state.

Here, there are taken measures for not causing any peak to occur in the frequency characteristics of the conversion impedance of the current-voltage converting circuit even when the temperature varies, that is, for rendering the stability of the circuit to be strong against the temperature change.

For the resistors R1 and Ri which eventually form the band-pass filter in this DC feedback circuit, ones having the same temperature characteristics are selected, so that, even when the value of Ri is caused to remarkably vary due to the temperature variation, the value of R1 will also vary in similar manner to achieve a temperature compensation, and the selectivity Q is eventually not caused to vary. In other words, there occurs no peak in the frequency characteristics of the conversion impedance, and the stability can be attained.

Figure 17:
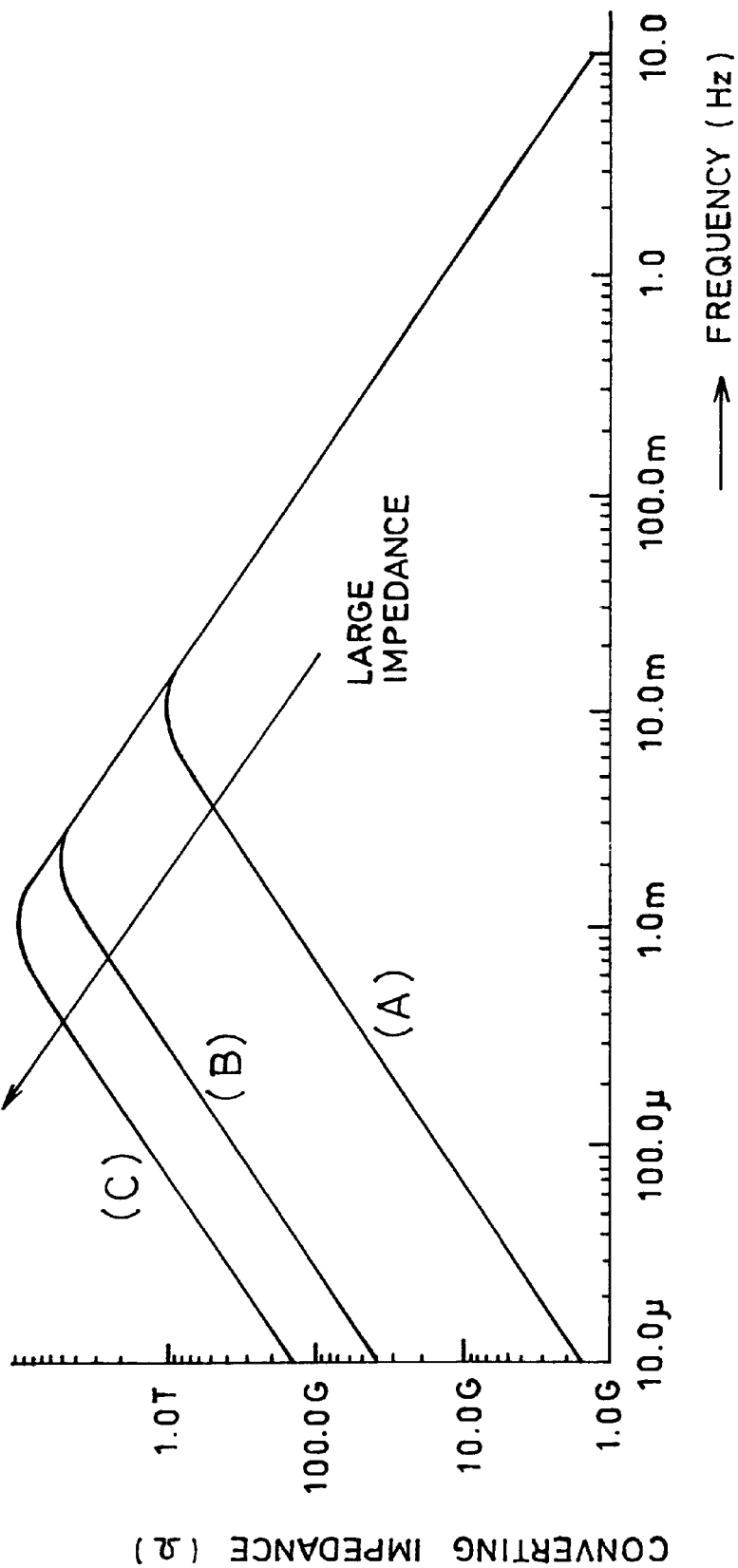
FIG. 17 is a diagram showing frequency characteristics of converting impedance in the circuit of FIG. 16.

In FIG. 17, results of simulation of the frequency characteristics of the conversion impedance in the above current-voltage converting circuit are shown. Circuit constants are so set that the element capacity Ci =12pF for the pyroelectric element A, the element capacity Ci=Cf=12pF for the other pyroelectric element B which functions as the feedback capacity Cf, Ri=1TΩ, R1=2.4GΩ and C1=10nF. In the drawing, the simulation results are shown by a curve (A) for the case in which the resistors Ri and R1 are made 1 time as large, by a curve (B) for the case of 5 times as large and by a curve (C) for the case of 10 times as large.

Figure 18:
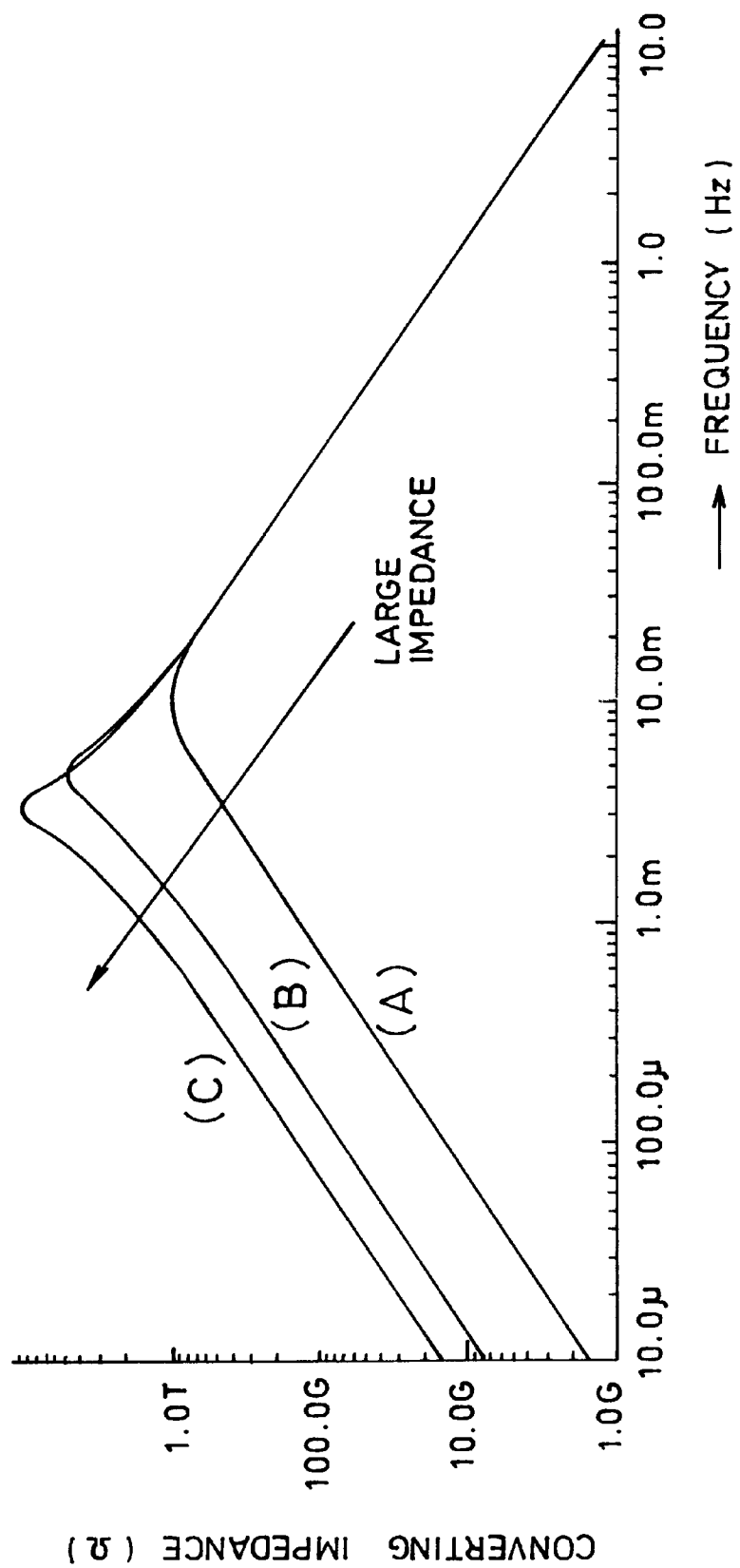
FIG. 18 diagram showing frequency characteristics of converting impedance in the case where the featured arrangement of FIG. 16 is absent.

FIG. 18 represents the frequency characteristics of the impedance in the case where the temperature characteristics of the resistors Ri and R1 are not provided. While the circuit constants are the same as the case of FIG. 17, the characteristics are shown with the resistor Ri only varied to be 1 time in the curve (A), 5 times in the curve (B) and 10 times in the curve (C).

As will be clear from these results, the frequency characteristics of the conversion impedance has a sharper peak as the resistance becomes larger, whereas in FIG. 17 no sharp peak is present, and any fluctuation has been removed from the characteristic curve. According to such current-voltage converting circuit, the selectivity Q of the circuit does not vary even when the value of the high resistance element in the circuit remarkably changes due to the temperature change, and the circuit stability can be improved even under variation in ambient temperature. Particularly around 1 Hz which is the frequency for detecting the human body is present in a much lower sloped level than a flat peak value, and it will be appreciated that the circuit is extremely stable in respect of the frequency characteristics for the human body detection.

Figure 19:
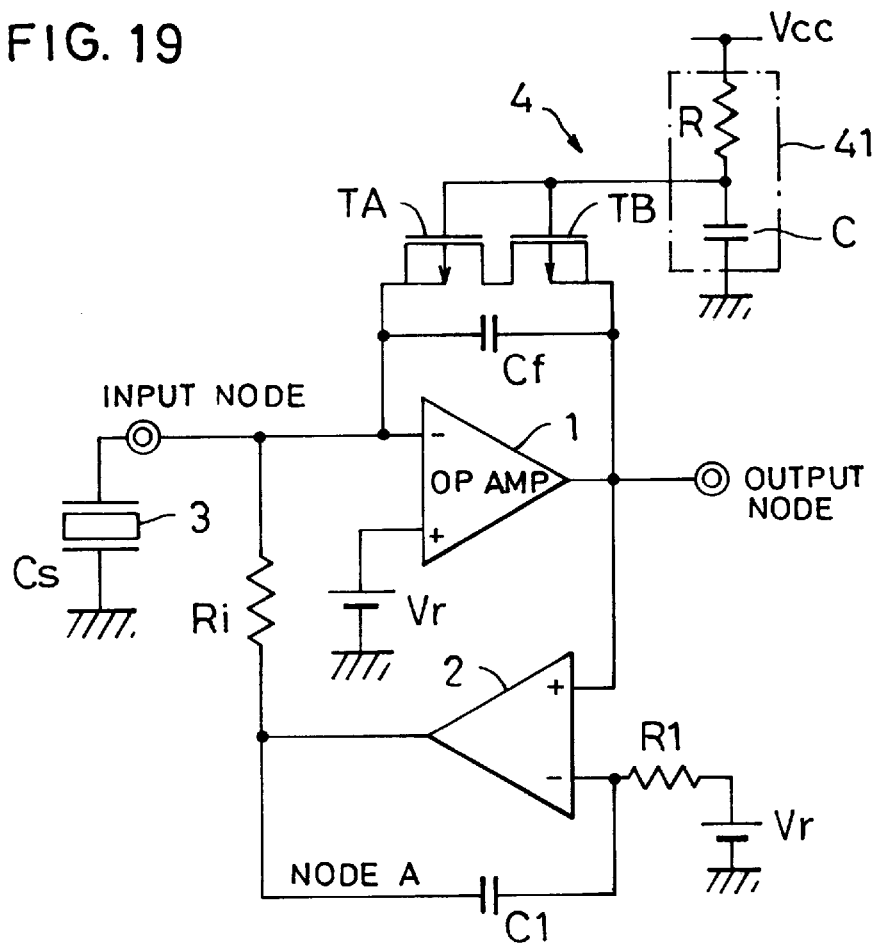
FIG. 19 is a schematic circuit diagram showing another concrete aspect of the sensor of FIG. 16.
Figure 21:
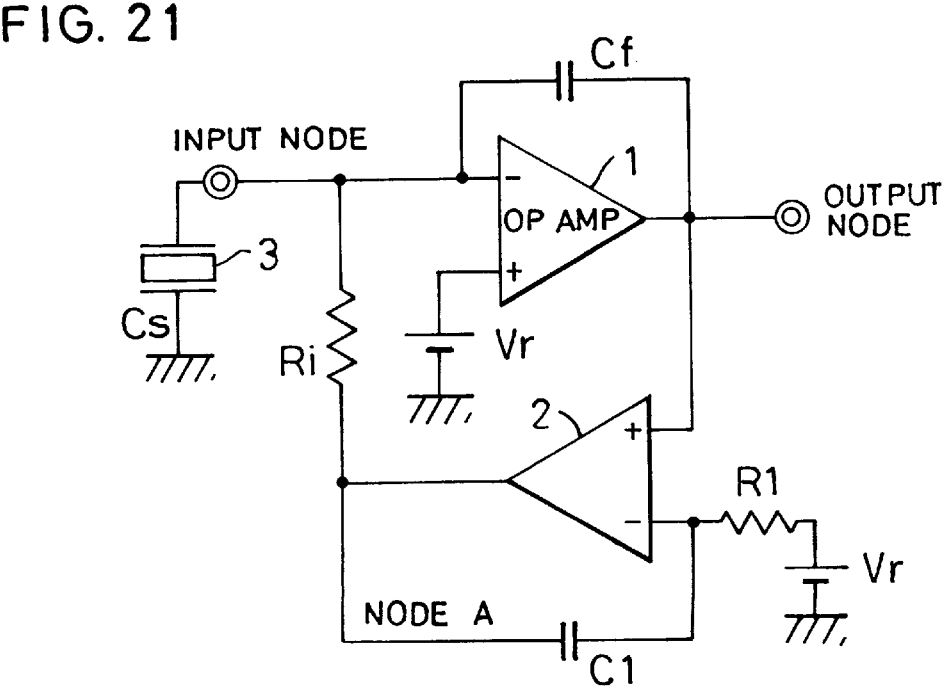
FIG. 21 is a characteristic diagram of the sensor of FIG. 16.

FIG. 19 is a circuit diagram showing a concrete working aspect of the circuit of FIG. 16, in which the feedback capacity Cf is provided with a rapid start circuit 4, in addition to the basic arrangement of FIG. 16. This rapid start circuit 4 is provided to connect two switching elements TA and TB in parallel to the feedback capacity Cf, to connect a delay circuit 41 formed by a series connection of a resistor R and a capacitor C to the gates of the switching elements TA and TB, and to supply a DC source power Vcc to this delay circuit 41. The two switching elements TA and TB should preferably be constituted by pMOSFET, while not required to be limited thereto.

Figure 20A:
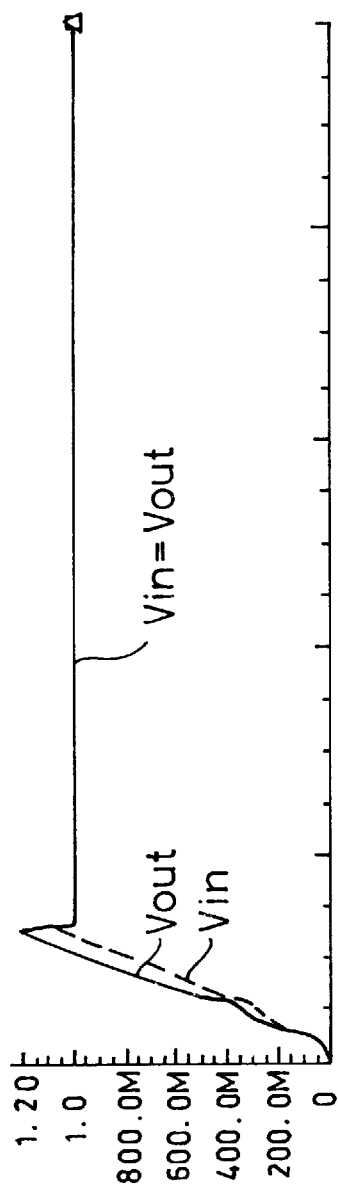
FIGS. 20A to 20C are explanatory views for the operation of the sensor of FIG. 19.
Figure 20B:
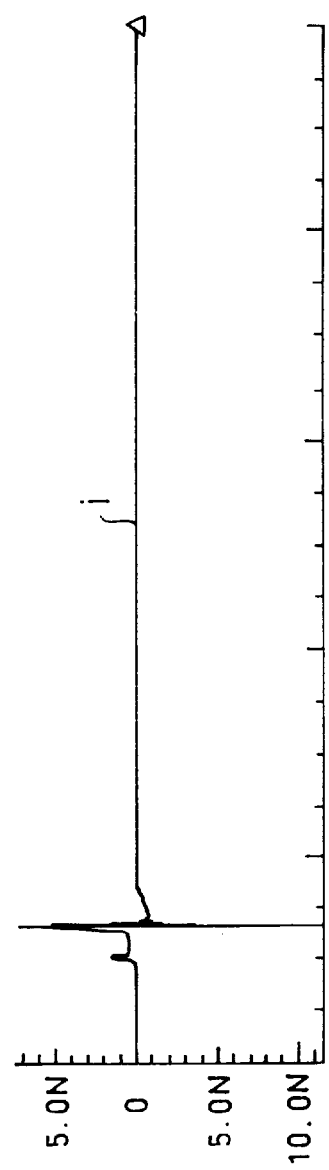
Figure 20C:
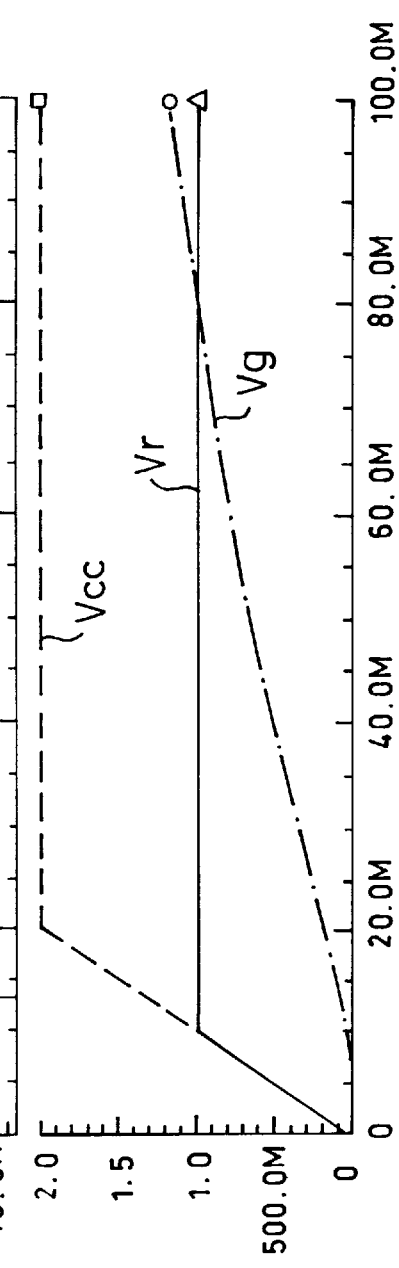

FIGS. 20A to 20C show results of simulation upon connecting the circuit of this working aspect to the power source. The circuit constants of this circuit are made the same as those in the simulation of FIG. 17. In FIG. 20C, Vr denotes a reference potential, Vcc denotes a DC source potential, and Vg denotes gate potential of the switching elements TA and TB. FIG. 20B shows a current i flowing to the switching elements TA and TB whereas, in FIG. 20A, Vout is a potential at an output node and Vin is a potential at an input node.

In the circuit of this working aspect of FIG. 19, a voltage at an output terminal of the capacitor C in the delay circuit 41 rises a delayed immediately after the connection to the source, and the capacitor holds its ON state until the gate potential Vg of a PMOS transistor forming the switching element reaches an OFF level, whereby the input-equivalent capacity is caused to be rapidly charged and discharged. As a result, it is appreciated that as seen in FIG. 20A the potential Vout at the output node is already stabilized at the time when the source voltage has fully risen.

The present invention as has been described is applicable to all circuits for converting the output current of the pyroelectric element into the output voltage with the use of the operational amplifier utilizing the feedback capacity. While in this case the use of the pyroelectric element as the feedback capacity is optimum in the present invention, any other arrangement employing a feedback circuit including an ordinary capacitor for obtaining a proper feedback capacity may even be employed as still another working aspect of the present invention. Further, while in the foregoing there have been disclosed a variety of working aspects in which the pyroelectric elements are connected in many ways, even an arrangement in which at least one pyroelectric element is connected exclusively to a feedback circuit may be effectively employed. Further, the equivalent capacity at the input stage of the operational amplifier upon the connection to the power source of course needs not be limited to the one performing the charge and discharge with the high resistance employed.

What is claimed is:

1. A pyroelectric infrared ray sensor comprising a first pyroelectric element, a current-voltage converting circuit for converting a current signal output from the pyroelectric element into a voltage signal, and an amplifying circuit for amplifying an output from the current-voltage converting circuit, wherein the current-voltage converting circuit comprises an operational amplifier, a DC feedback circuit for feeding back a DC component to the operational amplifier, and an AC feedback circuit for feeding back an AC component to the operational amplifier.

2. The sensor according to claim 1 wherein the AC feedback circuit comprises a capacitor.

3. The sensor according to claim 1 wherein the AC feedback circuit comprises a capacitor component of a second pyroelectric element.

4. The sensor according to claim 1 wherein the AC feedback circuit comprises a second pyroelectric element.

5. The sensor according to claim 4 wherein the first and second pyroelectric elements respectively comprise a plurality of selected ones of infrared ray receiving sections formed on an identical pyroelectric element substrate.

6. The sensor according to claim 4 wherein the first and second pyroelectric elements respectively comprise selective one of two infrared ray receiving sections formed on the same pyroelectric element substrate to render the element to be of a dual type.

7. The sensor according to claim 1 wherein the operational amplifier has an input impedance sufficiently large enough for rendering a current noise component of the amplifier to be smaller than a noise component occurring due to a dielectric loss of the pyroelectric element.

8. The sensor according to claim 1 wherein the DC feedback circuit includes an integration circuit.

9. The sensor according to claim 8 wherein a voltage dividing circuit is connected to an input end of the integration circuit.

10. The sensor according to claim 9 wherein the voltage dividing circuit comprises a circuit of resistors in a T-shape connection.

11. The sensor according to claim 8 wherein the integration circuit comprises a first resistor of a high resistance and a second resistor, the first and second resistors having substantially the same temperature characteristics.

12. The sensor according to claim 1 wherein the operational amplifier has an input-equivalent capacity matching with an equivalent capacity of the first pyroelectric element.

13. The sensor according to claim 12 wherein the operational amplifier includes an input transistor, and the input-equivalent capacity of the operational amplifier is determined by dimensions of gate electrode of the input transistor.

* * * * *